United States Patent [19]
Miki et al.

[11] Patent Number: 5,724,378
[45] Date of Patent: Mar. 3, 1998

[54] CDMA MULTIUSER RECEIVER AND METHOD

[75] Inventors: Yoshinori Miki, Yokohama; Mamoru Sawahashi, Yokosuka, both of Japan

[73] Assignee: NTT Mobile Communications Network, Inc., Japan

[21] Appl. No.: 569,002

[22] Filed: Dec. 7, 1995

[30] Foreign Application Priority Data

Dec. 13, 1994 [JP] Japan .................................. 6-309008
Jun. 12, 1995 [JP] Japan .................................. 7-144790

[51] Int. Cl.$^6$ .................................................. H04B 15/00
[52] U.S. Cl. .................................. 375/200; 375/346
[58] Field of Search ..................... 375/200, 205, 375/207, 208, 209, 210, 346, 348, 349; 370/342

[56] References Cited

U.S. PATENT DOCUMENTS

| | | | |
|---|---|---|---|
| 4,613,975 | 9/1986 | Aoyagi et al. | 375/349 |
| 5,457,711 | 10/1995 | Kellermann | 375/347 |
| 5,548,819 | 8/1996 | Robb | 455/59 |
| 5,638,376 | 6/1997 | Miki et al. | 370/342 |

FOREIGN PATENT DOCUMENTS

| | | |
|---|---|---|
| 0606546 | 7/1994 | European Pat. Off. . |
| 6-268630 | 9/1994 | Japan . |

OTHER PUBLICATIONS

IEEE Transaction on Communications, vol. 38, No. 4, NY, USA, pp. 496–508, XP002019257 Lupas R, Verdu S: "Near-far resistance of multiuser detectors in asynchronous channels" Apr. 4, 1990.

Transactions of the Institute of Electronics, Information and Communication Engineers, vol. e71, No. 3, Japan, Masamura T: "Spread spectrum multiple access system with intrasystem interference cancellation" Mar. 1988.

Electronics Letters, vol. 31, No. 19, Stevenage GB, pp. 1636–1637, XP000530371, Miki Y; Sawahashi M: "Preselection-type coherent decorrelating detector for asynchronous DS–CDMA" Sep. 13, 1995.

Technical Report of IEICE, SAT95-15, RCS91-51, pp. 49–54. "Performance Evaluations of Pre-selection Coherent Decorrelator for DS–CDMA" Yoshinori Miki and Mamoru Sawahashi, Jul., 1995.

Proceedings of the 1995 IEICE General Conference, B–417, p. 417. "Decorrelator with Pre-selection in the Reverse Channel of DS–CDMA" Yoshinori Miki and Mamoru Sawahashi, Mar. 27–30, 1995.

Proceedings of the 1995 Communications Society Conference of IEICE, B–270, p. 270 "Influence of Symbol Truncation Length for Pre-selection Decorrelator" Yoshinori Miki and Mamoru Sawahashi, Sep. 5–8, 1995.

(List continued on next page.)

*Primary Examiner*—Stephen Chin
*Assistant Examiner*—Kevin Kim
*Attorney, Agent, or Firm*—John T. Johnson; Rogers & Wells

[57] ABSTRACT

A CDMA receiver capable of effective orthogonalization even when the number of received signal vectors to be orthogonalized is very large. Received signals which have been spread by spreading codes are despread by despreading filters. Products of received signal levels and cross-correlations between the spreading codes are compared in a preliminary selector of the cross-correlations, and Ns products are selected in order of magnitude, where Ns is a predetermined integer. Ns received signals associated with the selected products have priority to undergo orthogonalization. The number of signals to be orthogonalized by decorrelators can be effectively decreased, and noise enhancement effect can be reduced on the reverse channels. The orthogonalized received signals are recovered through channel estimators, phase compensators, RAKE combiners and decision blocks.

13 Claims, 19 Drawing Sheets

OTHER PUBLICATIONS

Technical Report of IEICE, RCS95-6 (1995-04), p. 33, "Coherent Orthogonal Filter using pilot channel data estimation in Ds-CDMA Forward link Channels" Hidehiro Andoh, Yoshinori Miki and Mamoru Sawahashi, Apr. 21, 1995.

2nd International Workshop on Mobile Multimedia Communications, Bristol University "Multimedia Mobile Radio Access Based On Coherent DS-CDMA" F. Adachi, K. Ohno, M. Sawahashi and A. Higashi, Apr. 11-14, 1995.

Technical Report of IEICE, IT94-96, SST94-79 pp. 25-30, "Preselection-type Coherent Decorrelating Detector for Reverse-link Channel of DS-CDMA Cellular System" Yoshinori Miki and Mamoru Sawahashi, Mar. 16, 1995.

IEEE Transactions on Vehicular Technology, vol. 42, No. 2, pp. 137-146, "Rayleigh Fading Compensation for QAM in Land Mobile Radio Communications" Seiichi Sampei and Terumi Sunaga, May, 1993.

| | |
|---|---|
| CH₀ | PILOT SYMBOLS |

| | |
|---|---|
| CH₁ | INFORMATION SYMBOLS |

⋮

| | |
|---|---|
| CHₙ | INFORMATION SYMBOLS |

*FIG.5B*

CDMA MULTIUSER RECEIVER AND METHOD

BACKGROUND OF THE INVENTION

1. Field of the Invention

The present invention relates to a CDMA (Code Division Multiple Access) multiuser receiver and method using spread spectrum, which is suitable for cellular mobile communications.

2. Description of Related Art

DS-CDMA (Direct Sequence CDMA) is a promising candidate of a radio access method for the next generation mobile communications, and intensive research into it has been carried on. The DS-CDMA is a communication method, in which a plurality of users carry out communications simultaneously utilizing the same frequency range, and the individual users are identified by spreading codes. In the DS-CDMA cellular system, interference due to cross-correlation between the spreading codes assigned to the users not only degrades the communication quality, but also limits the capacity in terms of the number of subscribers. This type of interference will further increase owing to multipaths between a base station and mobile stations. Specifically, besides the cross-correlations between different spreading codes, cross-correlations due to receive timing differences between multipaths using the same spreading code cause such type of interference and degrade the communication quality. Thus, interference canceling (or orthogonalization) technique is important.

The canceling technique in the DS-CDMA is roughly classified into a single user method and a multiuser method.

The single user method estimates the amplitude and phase of the received signal of an intended channel, followed by the decision, without considering the spreading code information of the other users. This method requires rather a low processing amount and small hardware dimension. It is difficult, however, to apply this method to a system using, as spreading codes, middle codes or long codes, that is, spreading codes with their period longer than that of a symbol, because it has no information on spreading codes of the other users, and adaptively carries out the orthogonalization based on the constancy of the spreading codes of the other users, that is, the fact that the spreading codes are kept fixed for each symbol.

On the other hand, the multiuser method estimates the amplitude and phase of an intended received signal using information on spreading codes of the entire users, and carries out the orthogonalization between signals of all the users. As the multiuser method, a replica regeneration type or a decorrelator type is known: the former reduces interference by regenerating received signals sequentially beginning from the greatest received power and subtract them from the whole received signal through multi-stages; and the latter cancels interference by forming a correlation matrix using cross-correlations between the spreading codes, and by multiplying its inverse matrix by a received signal vector.

Generally, more effective interference canceling can be expected in the multiuser method than in the single user method, because information (receive timings, levels, spreading codes) about a plurality of users is available although its hardware dimension and processing amount grow larger than in the single user method.

FIG. 1 is a block diagram showing a conventional CDMA receiver using the multiuser method. This receiver employs a decorrelator disclosed in R. Lupas and S. Verdu, "Near-Far Resistance of Multiuser Detectors in Asynchronous Channels", IEEE Trans. Com. vol. COM-38, No. 4 pp. 496–508, April 1990.

It is assumed in the receiver that the number of simultaneous users is K, the number of receiving paths of individual users are $L_1, L_2, \ldots L_K$, respectively, and the total number of all the receiving paths, that is, the total sum of $L_1, L_2, \ldots, L_k$ is M.

The received signal is divided into M parts, and fed to despreading filters 11 (11-1–11-M) provided for individual paths of the users. A spreading code generator 10 refers to identification numbers of the users, and supplies spreading codes to respective despreading filters 11 and a cross-correlator 12.

The despreading filters 11 despread the received signal using filter coefficients based on the spreading codes supplied, and output information symbols and receive timing information. The cross-correlator 12, using the spreading codes from the spreading code generator 10 and receive timing information from the despreading filters 11, calculates cross-correlations between the spreading codes of all the paths, and feeds them to a decorrelator 15. The decorrelator 15 forms a correlation matrix, an array of cross-correlations supplied thereto, calculates an inverse matrix of the correlation matrix, and multiplies the inverse matrix by received signal vectors, thereby carrying out orthogonalization between the entire received signal vectors.

The signal vectors after the orthogonalization are RAKE combined by RAKE combiners 18 (18-1–18-K). That is, signals received from the entire paths of each users undergo phase correction, followed by weighted combining. The RAKE combined received signals undergo symbol decision by decision blocks 19 (19-1–19-K). Thus, the received signals are decoded.

The decorrelator proposed by Verdu et al. assumes that the despreading codes are invariant for individual symbols, that is, the period of the spreading codes is identical to that of the symbols. However, a method is proposed for implementing a decorrelator for a system using middle codes or long codes, which are spreading codes with periods longer than that of symbols (Japanese patent application No. 6-84865/1994). According to this technique, the decorrelator can also be applied to a system using both long codes and short codes. In this specification, the term "short code" refers to a spreading code whose period is one symbol long, or 128 chip intervals or less in practice. The term "middle code" refers to a spreading code whose period is considerably longer than that of symbols, ranging from more than processing gain to 10,000 symbol intervals. The term "long code" refers to a spreading code whose period is sufficiently longer than that of symbols, exceeding 10,000 symbol intervals. By using such codes in connection with the decorrelator makes orthogonalization possible on reverse channels within a cell in the CDMA cellular.

The conventional orthogonalization using the decorrelator, however, presents the following problems:

(1) When a great number of signal vectors are subject to the orthogonalization in the conventional method, characteristics of the orthogonalization is much degraded because its effect is canceled owing to noise enhancement. Furthermore, when the number of the signal vectors to be orthogonalized exceeds the processing gain, the orthogonalization itself becomes principally impossible.

FIG. 2 shows an increase of bit error rates obtained by computer simulation when the number of simultaneous users steps up such as 5, 10, 15, 20 and 25. The abscissas of the graph indicate energy per bit to noise spectral density Eb/No, and the ordinates represent average bit error rates. In the simulation, it is assumed that the processing gain Pg=31, and the primary and secondary modulations are both BPSK.

As is seen from this figure, as the number of the simultaneous users increases, the average bit error rates increase and the communication quality degrades. In addition, when the number of the simultaneous users exceeds the processing gain, no inverse matrix of the correlation matrix exists, and the orthogonalization processing becomes impossible.

Under multipath environments in particular, the number of signals to be orthogonalized exceeds the number of simultaneous users, and grows M−1, where M is the total number of the entire paths. As a result, the number of simultaneous users that can be orthogonalized is greatly reduced as the number of paths increases.

(2) Since the decorrelator 15 of the conventional receiver calculates the decorrelations in a batch mode, the dimension of the matrix grow large, and an amount of the calculation becomes huge, which presents another problem.

SUMMARY OF THE INVENTION

It is therefore an object of the present invention to provide a CDMA multiuser receiver and method which can implement effective orthogonalization and reduce a processing amount.

In a first aspect of the present invention, there is provided CDMA multiuser receiver in a CDMA system in which a transmitter side assigns different spreading codes to respective users, and transmits symbols of the users after spectrum spreading the symbols using the spreading codes associated with the users, and a receiver side receives signals transmitted from the users through one or more paths, and separates at least one of received signals, the CDMA multiuser receiver comprising:

despreaders for despreading the received signals by using spreading codes associated with the users, and for outputting receive timing information of the received signals on each of the paths;

level detectors for detecting received signal levels of the received signals on the paths;

cross-correlation calculation means for calculating for each of the paths cross-correlations between the spreading codes taking account of the receive timing information;

selecting means for obtaining, for each of the paths, interference amounts from the other paths on the basis of the received signal levels and the cross-correlations between the spreading codes, and for selecting Ns paths in order of magnitude of the interference amounts (Ns is an integer greater than one); and decorrelators for obtaining despread outputs, from which interferences are canceled, on the basis of received symbols and cross-correlations associated with the Ns paths selected.

The spreading codes may consist of short codes and long codes, the short codes each having a period equal to one symbol duration, and the long codes each having a period greater than 10,000 symbol intervals.

The spreading codes may consist of middle codes, the middle codes each having a period longer than one symbol period and shorter than 10,000 symbol intervals.

The spreading codes may consist of short codes whose period equals one symbol duration.

The spreading codes may consist of short codes whose period equals one symbol duration, and wherein different spreading code groups are used in different cells.

The interference amounts from other paths may be products of the received signal levels of other paths and cross-correlations between the spreading codes.

The decorrelators may be each provided for each of the paths.

The level detectors may detect levels of output signals of the despreaders.

The level detectors may detect levels of output signals of the decorrelators.

The CDMA multiuser receiver may further comprise channel estimation means connected to output terminals of the decorrelators for estimating phase fluctuations due to fading on the basis of pilot symbols of a known pattern, and wherein the level detectors detect levels of output signals of the channel estimation means.

The pilot symbols may be periodically inserted into information symbols.

The pilot symbols may be continuously transmitted through a dedicated channel.

In a second aspect of the present invention, there is provided a CDMA multiuser receiving method in a CDMA system in which a transmitter side assigns different spreading codes to respective users, and transmits symbols of the users after spectrum spreading the symbols using the spreading codes associated with the users, and a receiver side receives signals transmitted from the users through one or more paths, and separates at least one of received signals, the CDMA multiuser receiving method comprising the steps of:

despreading the received signals by using spreading codes associated with the users, and for outputting receive timing information of the received signals on each of the paths;

detecting received signal levels of the received signals on the paths;

calculating for each of the paths cross-correlations between the spreading codes taking account of the receive timing information;

obtaining, for each of the paths, interference amounts from the other paths on the basis of the received signal levels and the cross-correlations between the spreading codes;

selecting Ns paths in order of magnitude of the interference amounts (Ns is an integer greater than one); and obtaining despread outputs, from which interferences are canceled, on the basis of received symbols and cross-correlations associated with the Ns paths selected.

According to the present invention, the total of Ns paths are selected in order of magnitude of received signal levels and cross-correlations between the spreading codes of respective paths (in order of magnitude of products of the received signal levels and the cross-correlations, for example), and the orthogonalization of the received symbols are carried out on the basis of cross-correlations of the selected paths. In this way, the number of signals to be orthogonalized on the reverse channels in the CDMA can be effectively reduced. In the conventional system, the effect of the orthogonalization is canceled owing to the noise enhancement occurring when the number of the signal vectors to be orthogonalized is very large. In addition, the conventional system has a problem in that when the number of signal vectors to be orthogonalized exceeds the processing gain, the orthogonalization itself becomes impossible. In contrast, the present invention can implement an effective orthogonalization processing.

Furthermore, since the present invention is provided with small decorrelators for individual paths of the users instead of the conventional batch decorrelator, a processing amount for obtaining inverse matrices can be greatly reduced. For example, when the number of signals to be orthogonalized is not so high as exceeding the processing gain, the processing amount can be greatly reduced by allowing a little degradation of the characteristics.

Moreover, the accuracy of detection of the received signal levels can be improved by using signals after the interference cancellation.

The above and other objects, effects, features and advantages of the present invention will become more apparent from the following description of the embodiments thereof taken in conjunction with the accompanying drawings.

BRIEF DESCRIPTION OF THE DRAWINGS

FIG. 5B is a schematic diagram illustrating a frame format used in the first embodiment, which includes a channel dedicated to pilot symbols;

DETAILED DESCRIPTION OF PREFERRED EMBODIMENTS

The invention will now be described with reference to the accompanying drawings.

Embodiment 1

Figure 1:
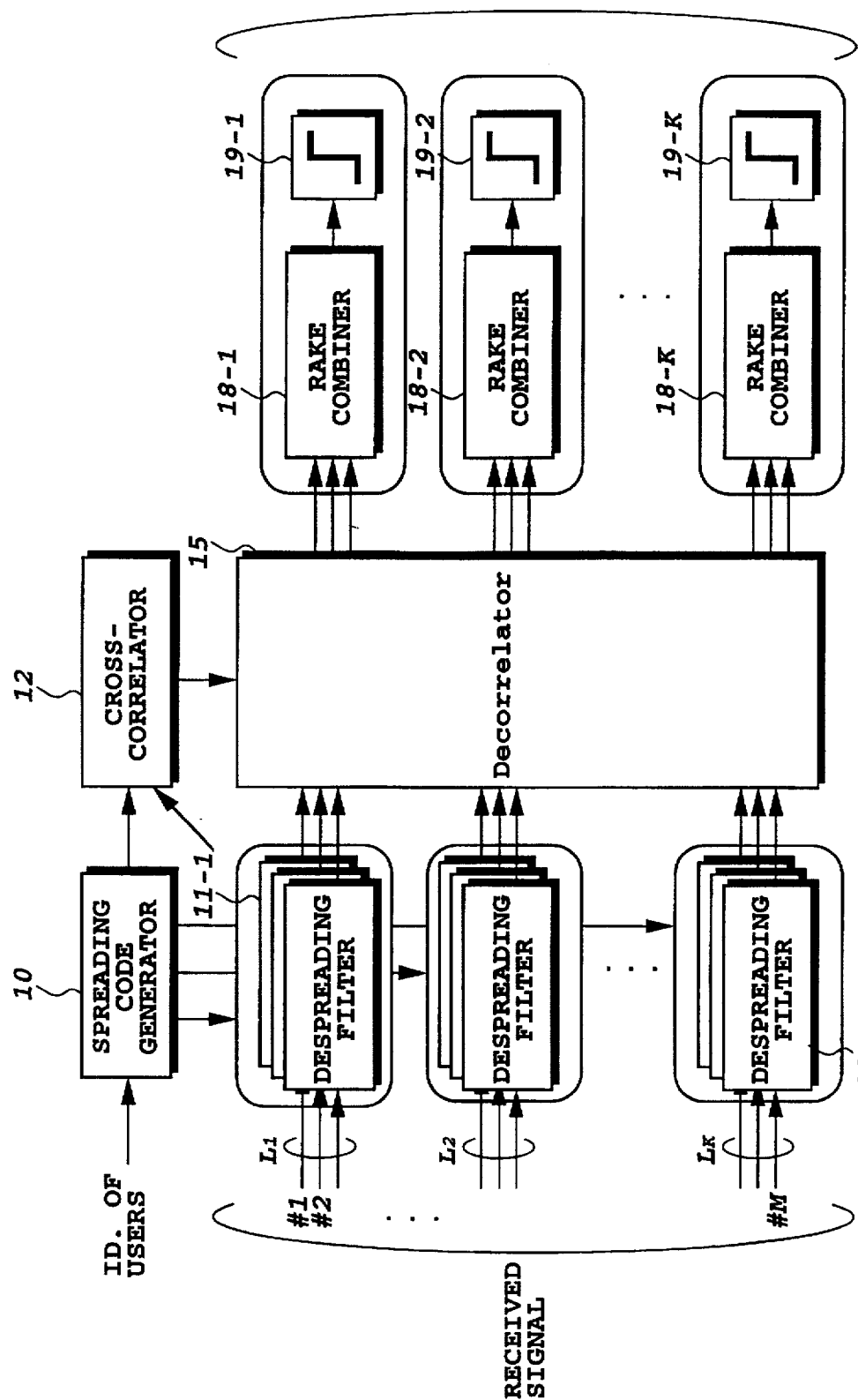
FIG. 1 is a block diagram showing a conventional CDMA receiver.
Figure 2:
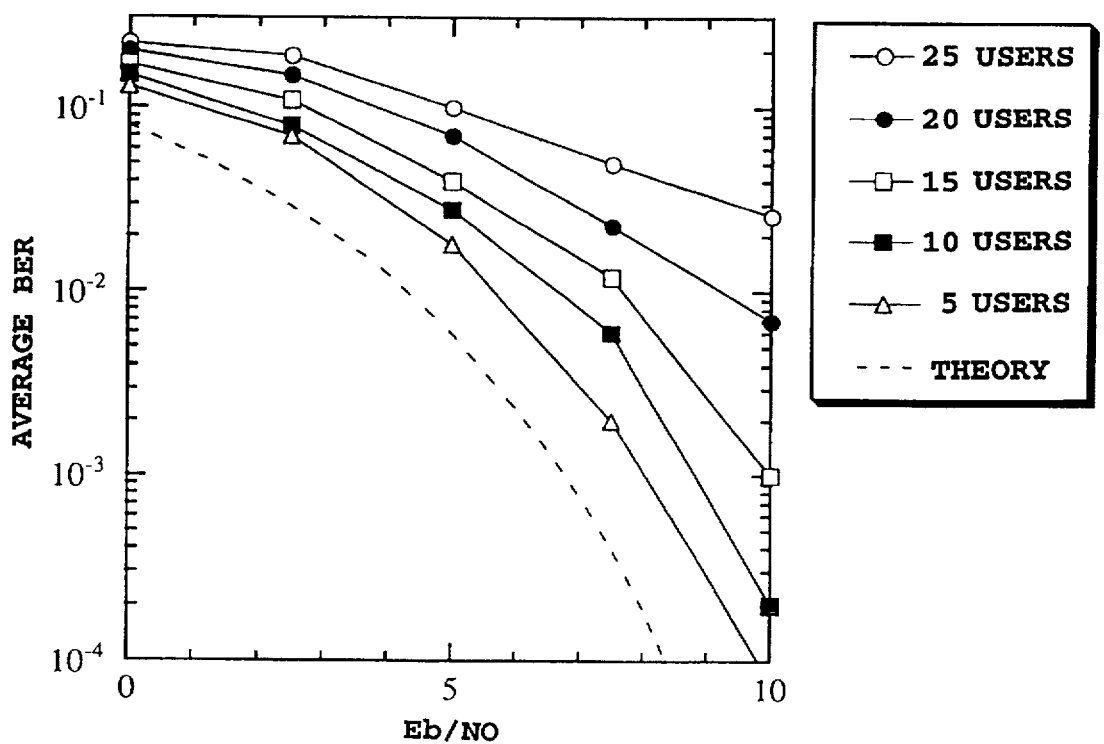
FIG. 2 is a graph illustrating characteristics of the conventional CDMA receiver.
Figure 3A:
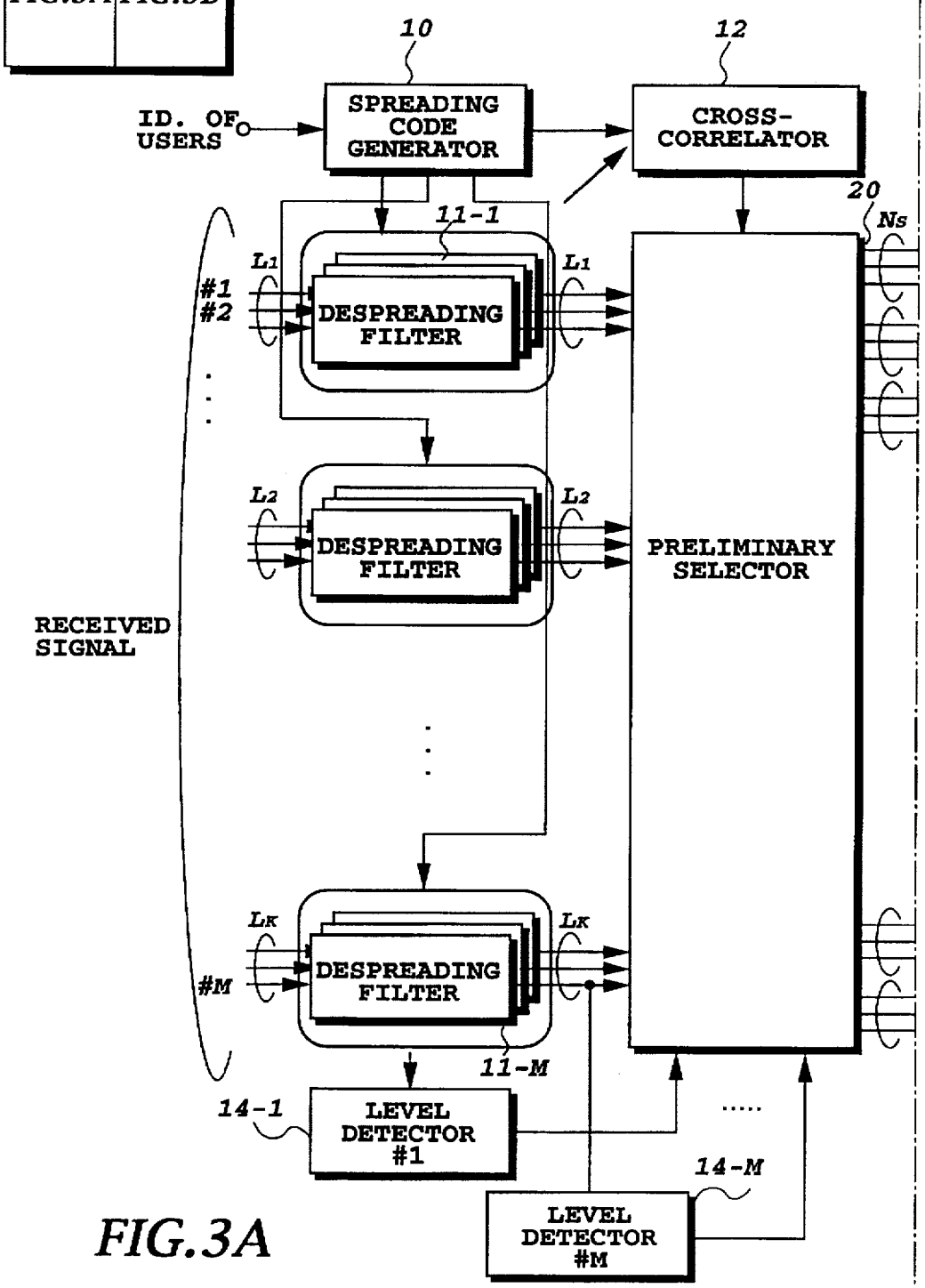
FIGS. 3A and 3B are block diagrams showing a first embodiment of a CDMA multiuser receiver in accordance with the present invention.
Figure 3B:
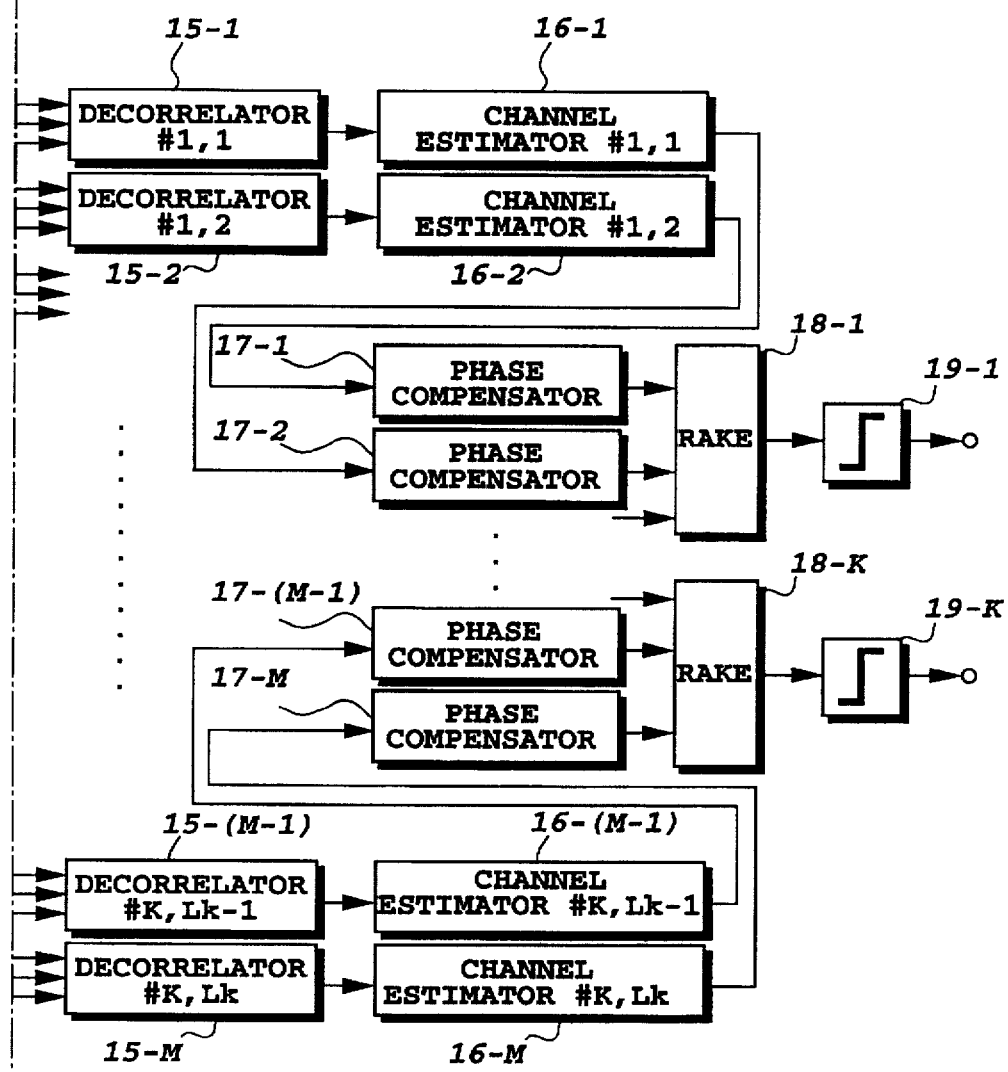

FIGS. 3A and 3B are block diagrams showing a CDMA multiuser receiver in accordance with the present invention. In FIGS. 3A and 3B, a spreading code generator 10 generates spreading codes assigned to individual users on the basis of identification numbers of users, and supplies the spreading codes to despreading filters 11. The spreading code generator 10 is implemented with a shift register for generating Gold codes or PN sequences. Alternatively, it can be realized with a fast readable semiconductor memory such as a ROM or RAM which stores the entire spreading codes, in connection with an address converter for producing a memory address from the user identification numbers.

The despreading filters 11 (11-1–11-M) despread a received signal using filter coefficients based on spreading codes fed from the spreading code generator 10, and output received symbols (despread signals) and receive timing information for each path of each user. The received symbols and receive timing information are fed to a preliminary selector 20, and the receive timing information is fed to a cross-correlator 12. The despreading filters 11 can be implemented with matched filters or sliding correlators.

The cross-correlator 12 calculates cross-correlations between the entire paths of all the users by using receive timing information fed from the despreading filters 11 and the spreading codes assigned to the individual users. The cross-correlator 12 can be implemented with a correlator, for example. Alternatively, when the number of the spreading codes is rather small, it is possible to prestore cross-correlations in a memory, and output the cross-correlations by using the receive timing information fed from the despreading filters 11, and the spreading codes assigned to the individual users.

Level detectors 14 (14-1–14-M) are connected to respective output terminals of the despreading filters 11 to detect signal levels of the paths.

The preliminary selector 20 is supplied with the received symbols and the receive timing information from the despreading filters 11, and with the cross-correlations from the cross-correlator 12. In addition, it is supplied with the received signal levels from the level detectors 14 (14-1–14-M).

Figure 4:
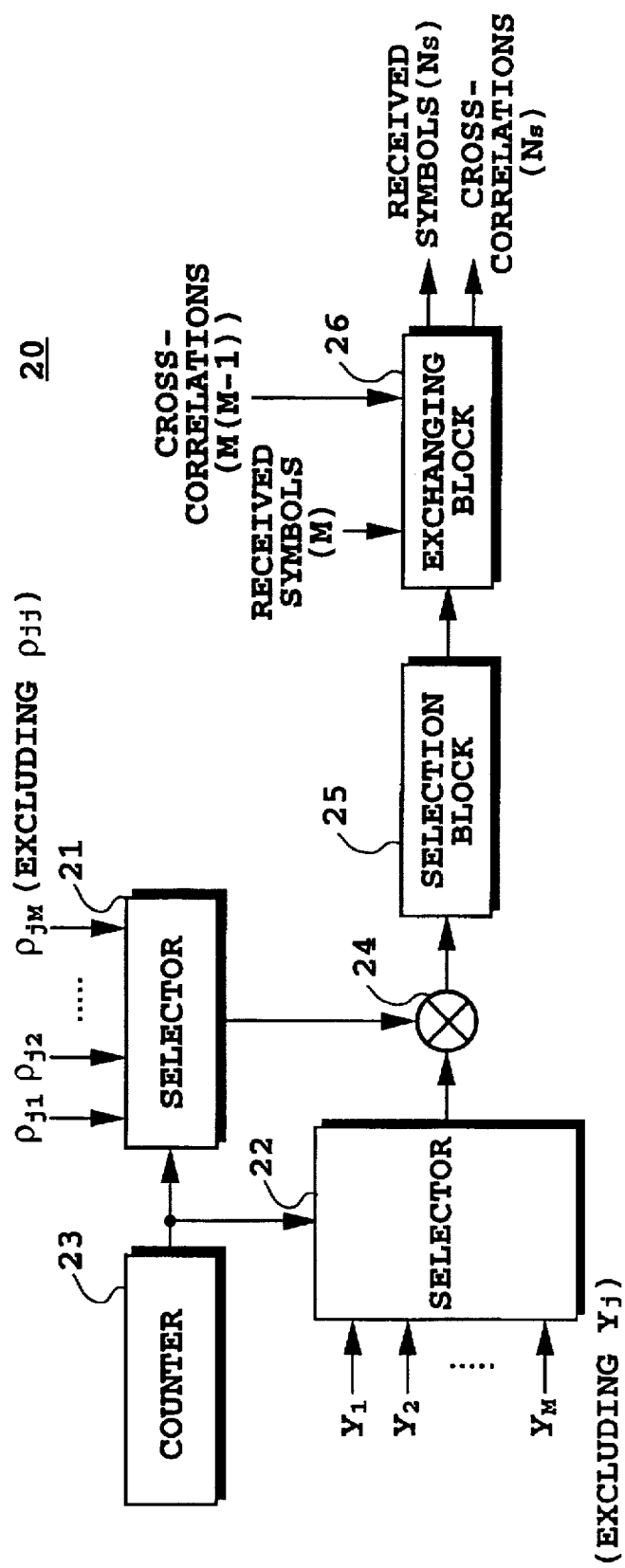
FIG. 4 is a block diagram showing a preliminary selector of the first embodiment.

FIG. 4 is a block diagram showing elements per path (j-th path) of the preliminary selector 20. Similar elements are provided for the other paths. In this figure, the reference numerals 21 and 22 designate selectors. The selector 21 is supplied with (M−1) cross-correlations $r_{j1}, r_{j2}, \ldots r_{jM}$ (excluding $r_{jj}$) per path from the cross-correlator 12. In other words, it is supplied with the cross-correlations between the j-th path and all the other paths. On the other hand, the selector 22 is provided with (M−1) received signal levels $y_1, y_2, \ldots y_M$ (except for $y_j$) per path from the level detectors 14. That is, the received signal levels of all the other paths are fed to the selector 22. The selectors 21 and 22 sequentially select one of the (M−1) cross-correlations and received signal levels, respectively, and feeds them to a multiplier 24. The multiplier 24 sequentially calculates products $r_{j1} \times y_1, r_{j2} \times y_2, \ldots r_{jM} \times y_M$, thereby outputting (M−1) products (interference amounts) of the cross-correlations and received signal levels for individual paths excluding the product of the j-th path. The results, which correspond to amounts of the interference to the j-th path from the other paths, are supplied to a selection block 25.

The selection block 25 selects Ns interference amounts from the (M−1) interference amounts. More specifically, it selects Ns interference amounts in order of magnitude, and supplies an exchanging block 26 with Ns indices indicating the paths associated with the selected interference amounts. The exchanging block 26 outputs cross-correlations between received symbols of the Ns paths and the j-th path.

Thus, Ns received symbols and Ns cross-correlations selected for each path are fed to a decorrelator 15-j (j=1–M) in FIG. 3B. The individual decorrelators 15 array the Ns received symbols fed from the preliminary selector 20 to form Ns-dimension received symbol vectors, and the Ns cross-correlations to form correlation matrices of a strap-like Hermitian matrix, and calculate the inverse matrices thereof. The decorrelators 15 further multiply the received symbol vectors by the inverse matrices to produce Ns-dimension vectors orthogonalized with each other, and supply them to channel estimators 16 (16-1–16-M). The decorrelators 15, whose main function is to calculate the inverse matrices, can be implemented with a DSP (Digital Signal Processor) or dedicated hardware such as a systolic array processor. In either case, a small size decorrelator can sufficiently achieve the function of the decorrelator 15 because it only handles Ns signals selected. A method for forming the correlation matrices by arraying the cross-correlations is disclosed in the S. Verdu et al. paper mentioned before.

Figure 5A:
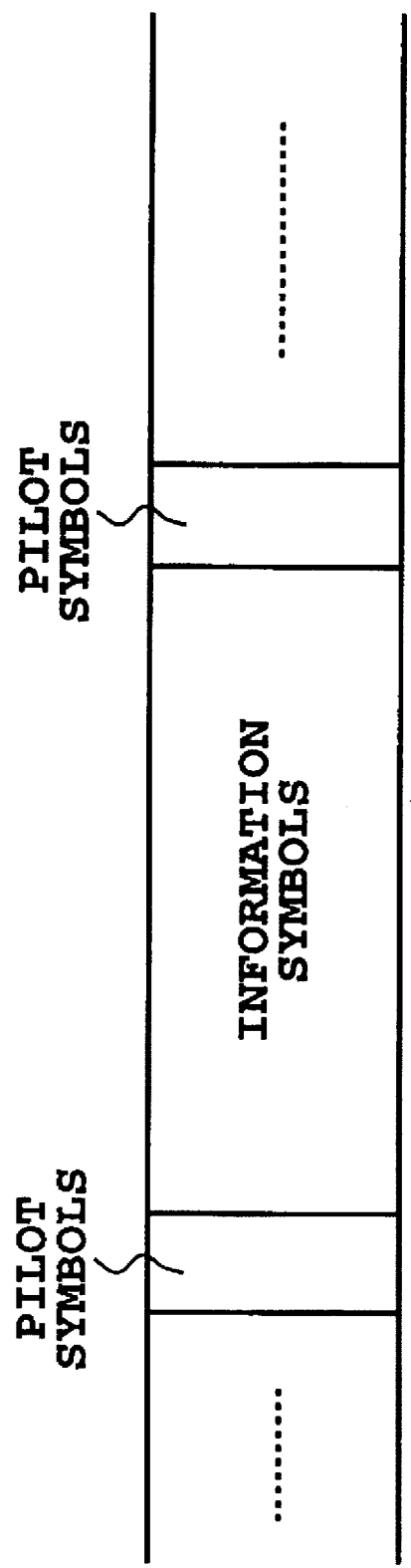
FIG. 5A is a schematic diagram illustrating a frame format used in the first embodiment, in which pilot symbols are interleaved into information symbols.

The channel estimators 16 estimate phase fluctuations and amplitude fluctuations due to fading for each path of each user. FIG. 5A illustrates a frame format employed to estimate such fluctuations. A transmitter side periodically inserts known pilot symbols into information symbols as shown in this figure. The channel estimators 16, using the pilot symbols, estimates the phase fluctuations and amplitude fluctuations by absolute coherent detection using pilot interpolation. Specifically, the channel estimators 16 form information for correcting the phase and amplitude of information symbols by averaging the transfer functions of channels obtained from the pilot signals, and by interpolating the averaged values into the information symbol sections. The information for correction is fed to phase compensators 17 (17-1–17-M). The phase compensators 17 compensate the phase fluctuations of received symbols of respective paths by using the phase fluctuation estimation values due to fading fed from the channel estimators 16. The details of this processing are described in S. Sampei, "Rayleigh Fading Compensation for QAM in Land Mobile Radio Communications", IEEE TRANSACTIONS ON VEHICULAR TECHNOLOGY, VOL. 42, NO. 2, MAY 1993, and Sawahashi, et al. PCT/JP95/01252, which are incorporated into this specification by reference. The pilot symbols may be transmitted continuously through a dedicated channel rather than inserting them into the information symbols, as shown in FIG. 5B. In this case, the phase and amplitude of the information symbols can be continuously compensated by using the phase and amplitude fluctuations of the pilot symbols corresponding to the information symbols.

The phase compensated received symbols are subject to weighting combining by RAKE combiners 18 (18-1–18-K) provided for respective users. As weighting factors by which the signals of the paths are multiplied, SIRs (Signal-to-Interference Ratios) of the paths, the received signal levels of the paths after the interference cancellation, or estimated values of amplitude fluctuations of the paths due to fading can be employed. Among these, the weighting factors in proportion to the SIRs of the paths provide the maximal ratio combining. The RAKE combined signals are decided by decision blocks 19 (19-1–19-K), thereby recovering the information symbols.

When cellular mobile communications employ the CDMA, an identical spreading code cannot be assigned to a multiple users within a cell. The same spreading code can only be reused in cells separated apart by a repetition distance determined considering interference amounts. This means the following:

(1) Spreading code assignment management is necessary among a plurality of cells.

(2) Since the total number of assignable spreading codes per cell is less than the processing gain, the number of the simultaneous users is also less than that.

To overcome such shortages, systems are proposed in which short codes are used in connection with long codes or only middle codes are employed instead of short codes alone. The present invention can also be applied to such systems.

Figure 6:
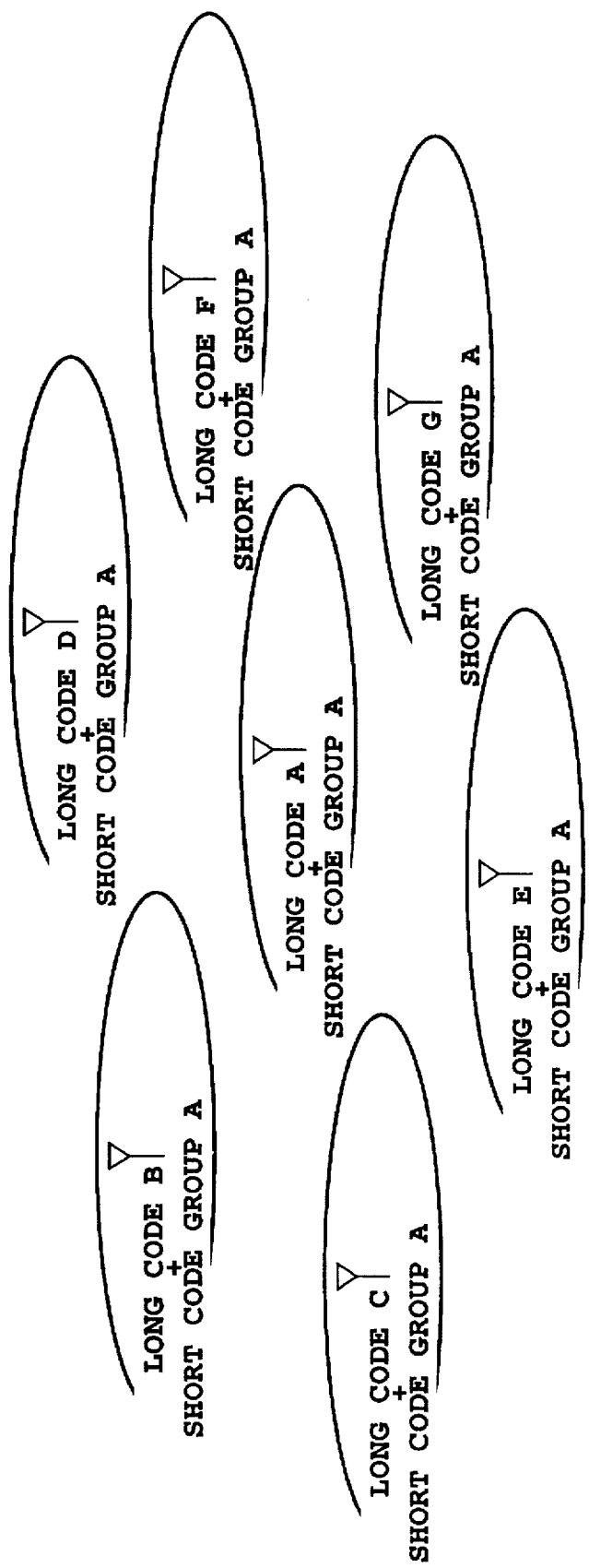
FIG. 6 is a schematic diagram illustrating a CDMA system using short codes in connection with long codes.

FIG. 6 is a schematic diagram showing a system employing the short codes in connection with the long codes. Individual cells use the same short code group A in connection with different long codes as spreading codes. By using the long codes with the short codes, the received signals from the other users are thoroughly made random and white. Thus assigning the different long codes to different cells makes it possible to use the same short code group in the individual cells. This will implement a management free system with regard to the spreading code assignment, thereby avoiding a decrease in the number of simultaneous users due to reduction in the assignable spreading codes. Furthermore, a further increase in capacity can be expected by reducing the interference between the users in the cell, that is, by carrying out the orthogonalization in the cell. The details of this are disclosed in Viterbi, A. M. and Viterbi, A. J., "Erlang Capacity of a power controlled CDMA system", IEEE J. Select. Area Commun. vol. 11, pp. 892–900, Aug. 1993.

Figure 7:
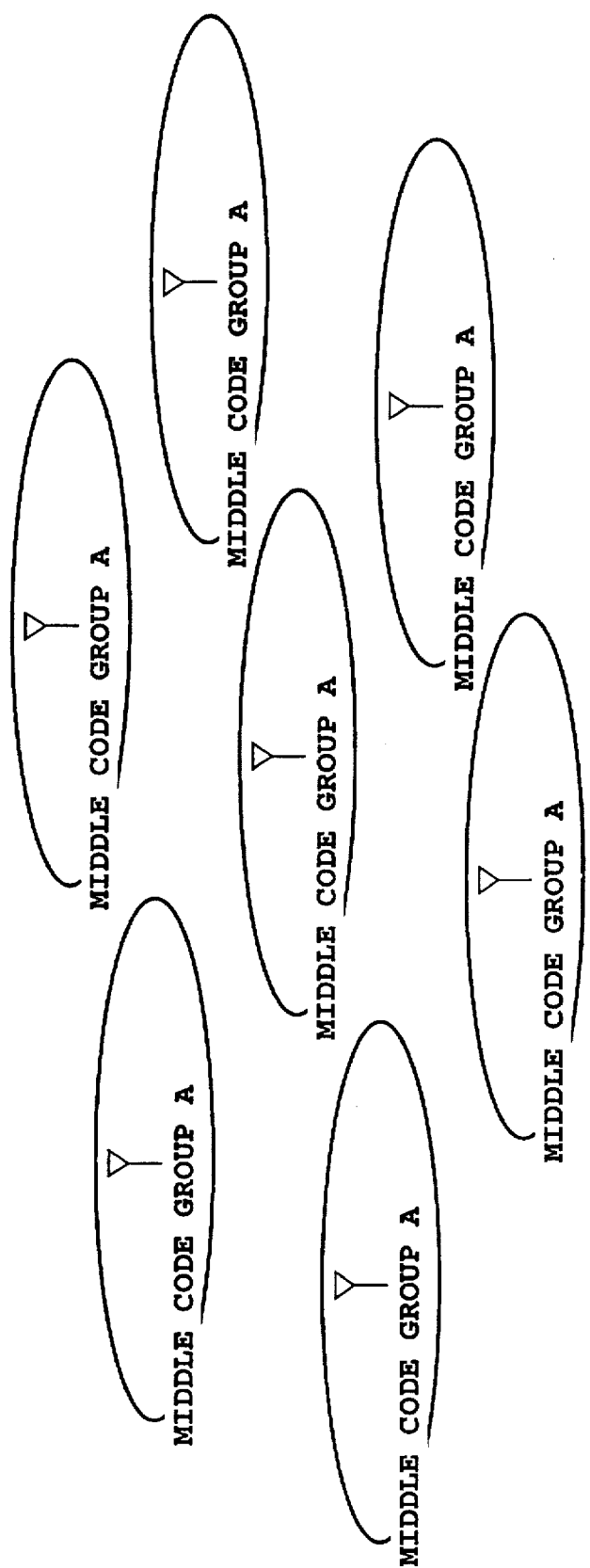
FIG. 7 is a schematic diagram illustrating a CDMA system using middle codes.

FIG. 7 is a schematic diagram showing a system employing the middle codes alone. The length of the middle codes must be set rather long such that the probability that the same spreading code is assigned to a plurality of users is sufficiently low even if the same code group is used in adjacent cells as shown in this figure. Using the middle codes makes it possible to increase the total number of the spreading codes, and to ameliorate the acquisition delay involved in the synchronization when only the long codes are employed. Although code management among adjacent cells is necessary in the system employing the middle codes, reduction in the number of simultaneous users can be prevented because of the sufficient number of assignable spreading codes.

Figure 8A:
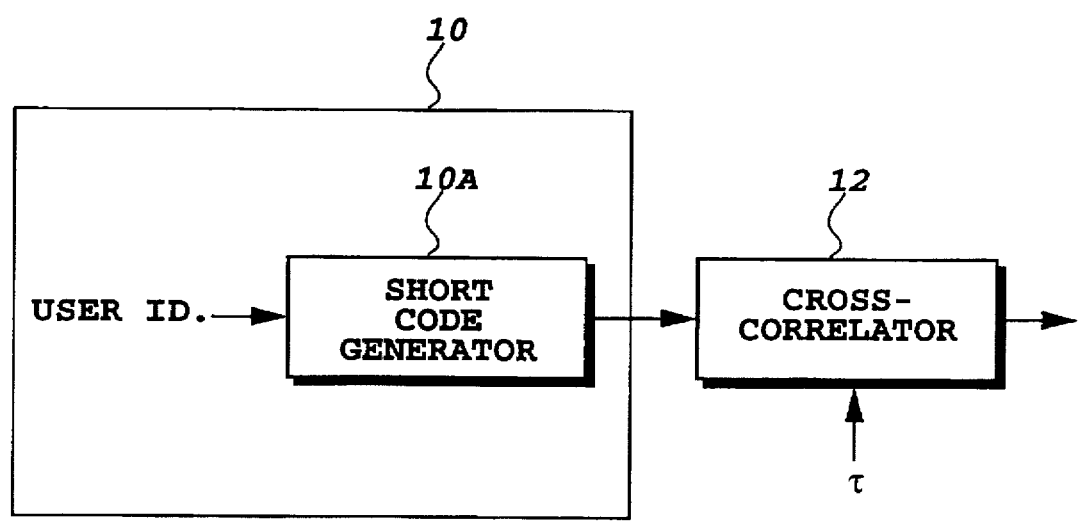
FIG. 8A is a block diagram showing a spreading code generator and a cross-correlator in a system using only short codes.
Figure 8B:
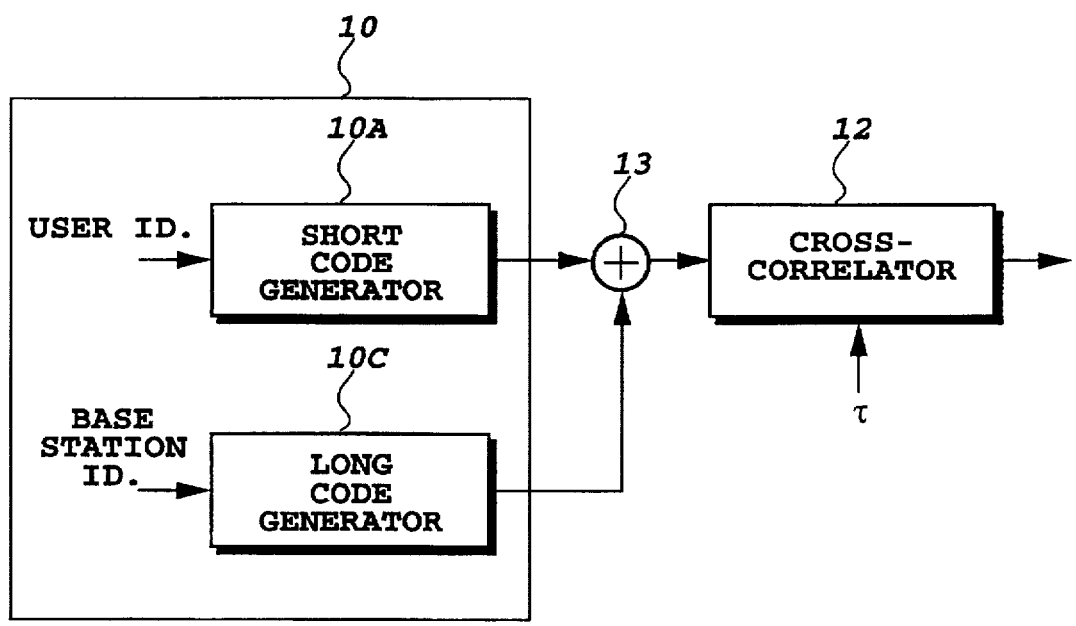
FIG. 8B is a block diagram showing a spreading code generator and a cross-correlator in a system using short codes in connection with long codes.
Figure 8C:
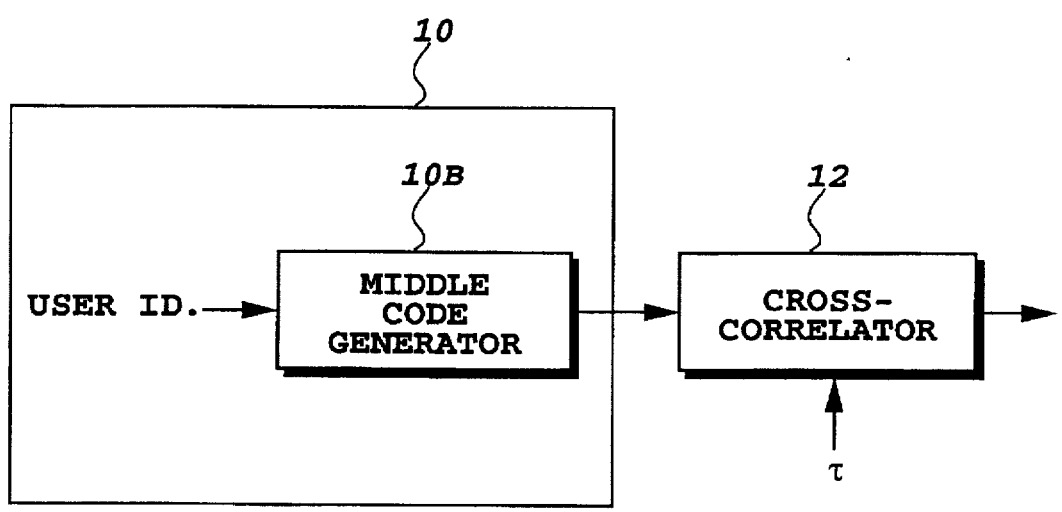
FIG. 8C is a block diagram showing a spreading code generator and a cross-correlator in a system using only middle codes.

FIGS. 8A–8C are block diagrams showing configurations of the spreading code generator 10 and the cross-correlator 12 when only the short codes are used, short codes are used in connection with the long codes, and only the middle codes are used, respectively.

In the case where only the short codes are employed, the spreading code generator 10, which is provided with a short code generator 10A as shown in FIG. 8A, generates short codes corresponding to user identification numbers, and feeds them to the cross-correlator 12. The period of the short codes is 256 chip intervals at most, which corresponds to one symbol length. It is enough for the cross-correlator 12 to calculate the cross-correlations only when a user starts communications or a change in receiving timings (that is, relative delay times between multipaths) occurs.

In the case where the short codes are used in connection with the long codes, the spreading code generator 10 is provided with a short code generator 10A and a long code generator 10B. The short code generator 10A generates short codes corresponding to user identification numbers, and the long code generator 10B generates long codes corresponding to a base station identification number. This is because different long codes are assigned to different adjacent cells as shown in FIG. 6. The generated short codes and long codes are fed to an EXCLUSIVE OR circuit (EX-OR) 13, and its output is fed to the cross-correlator 12. Since the spreading code changes from symbol to symbol in this method, the cross-correlator 12 must calculate the cross-correlations for each symbol.

In the case where only the middle codes are employed, the spreading code generator 10 is provided with a middle code generator 10C as shown in FIG. 8C. The middle codes generated by the middle code generator 10C are fed to the cross-correlator 12. In this method, too, since the spreading code changes from symbol to symbol, the cross-correlator 12 must calculate the cross-correlations for each symbol.

The cross-correlator 12 calculates the cross-correlations between the entire paths of all the users on the basis of the spreading codes fed from the spreading code generator 10 and the receive timings fed from the despread filters 11, and supplies the preliminary selector 20 with the cross-correlations.

Figure 9:
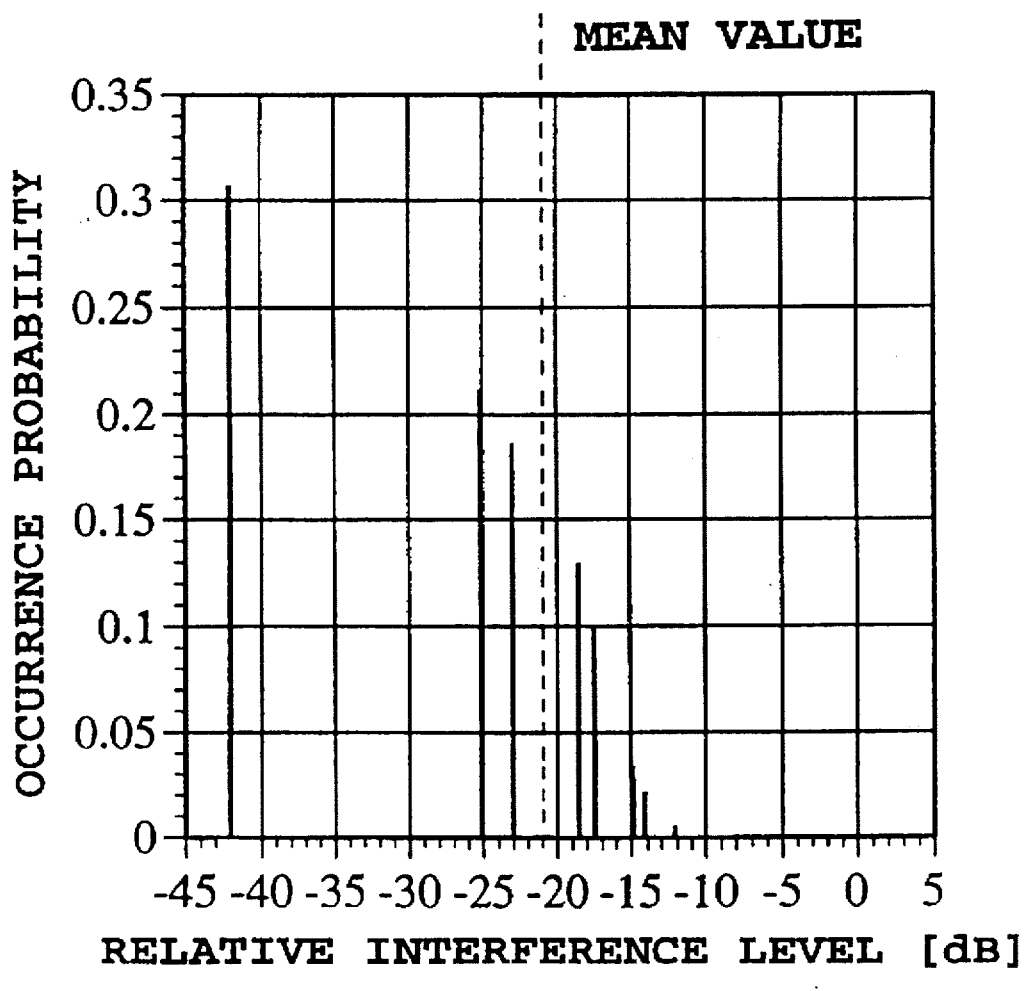
FIG. 9 is a profile illustrating cross-correlation distribution in a CDMA system using short codes.
Figure 10:
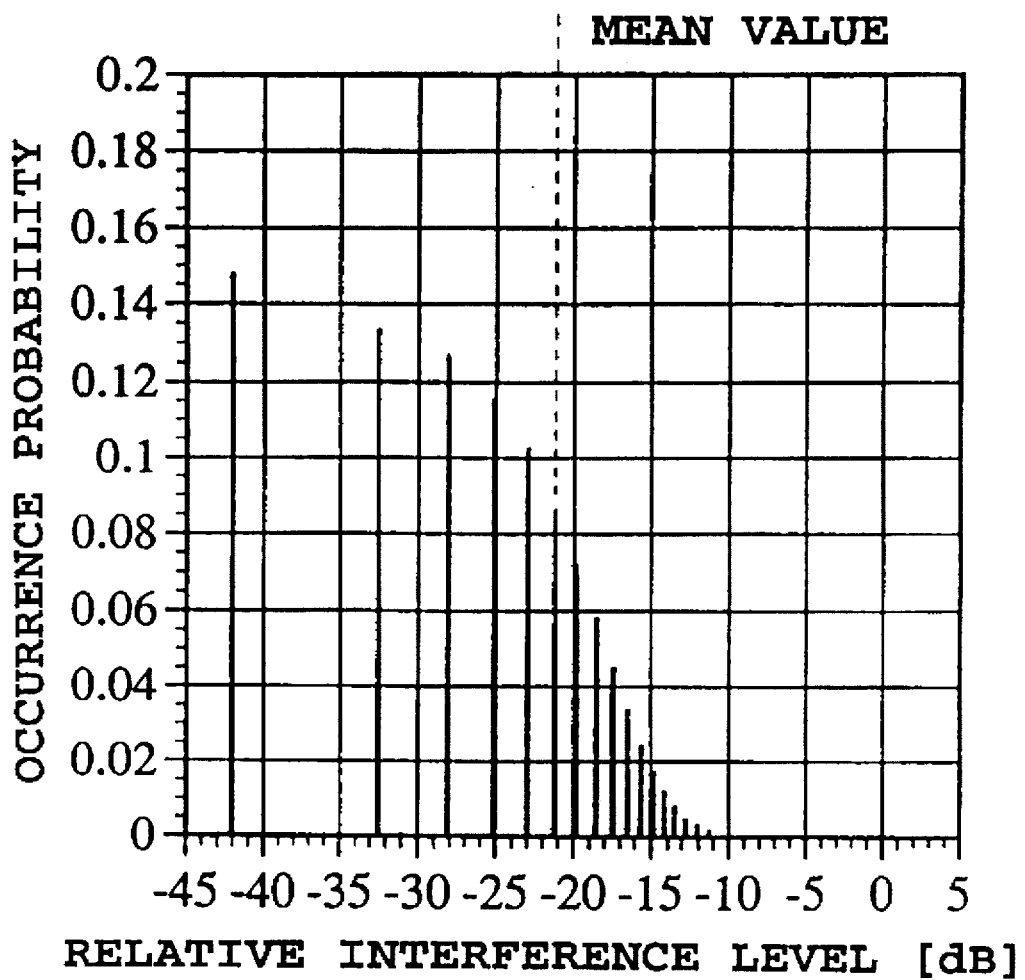
FIG. 10 is a profile illustrating cross-correlation distribution in a CDMA system using short codes in connection with long codes.

FIG. 9 shows distribution of the cross-correlations when different short code groups are used. FIG. 10 shows distribution of the cross-correlations when the short codes are employed in connection with the long codes, and FIG. 11 shows the distribution of the cross-correlations when the middle codes are used.

In these graphs, the abscissas represent values of the cross-correlations relative to the peak of autocorrelation, that is, the interference levels in terms of dB, and the ordinates indicate the occurrence probabilities of the cross-correlations. In these cases, it is assumed that the processing gain Pg=127, the short codes consist of Gold codes of seventh order, the long codes consist of PN sequences of 31-th order, and the middle code consist of Gold codes of 10-th order. Furthermore, it is assumed that the spreading codes and receive timings are random, and the number of trials is 100,000. In addition, the mean values of respective cases are shown in these figures.

Figure 11:
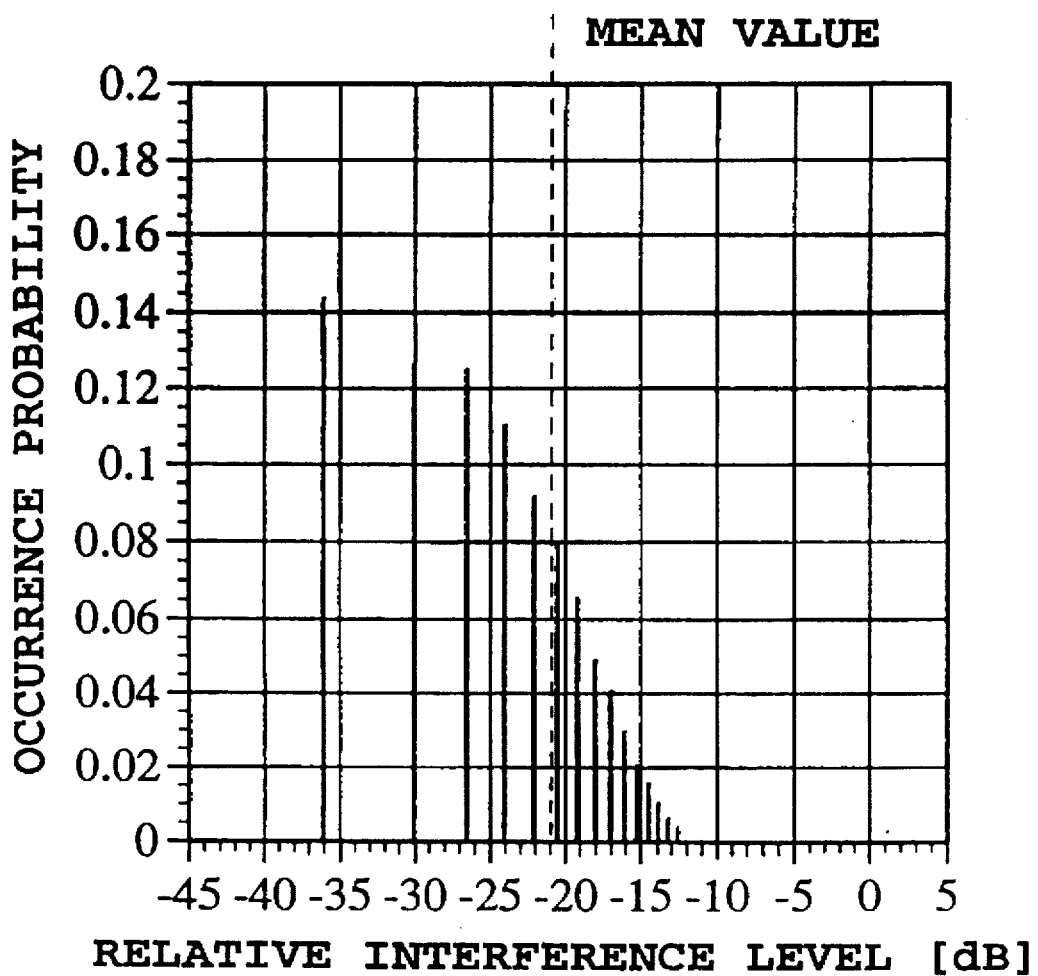
FIG. 11 is a profile illustrating cross-correlation distribution in a CDMA system using only middle codes.

As seen from FIGS. 9–11, the occurrence probabilities of cross-correlations (interference levels) exceeding the average values are less than half of the entire frequencies. This means that effective cancellations can be achieved by selectively canceling the interferences of large cross-correlations in the orthogonalization processing.

Figure 12:
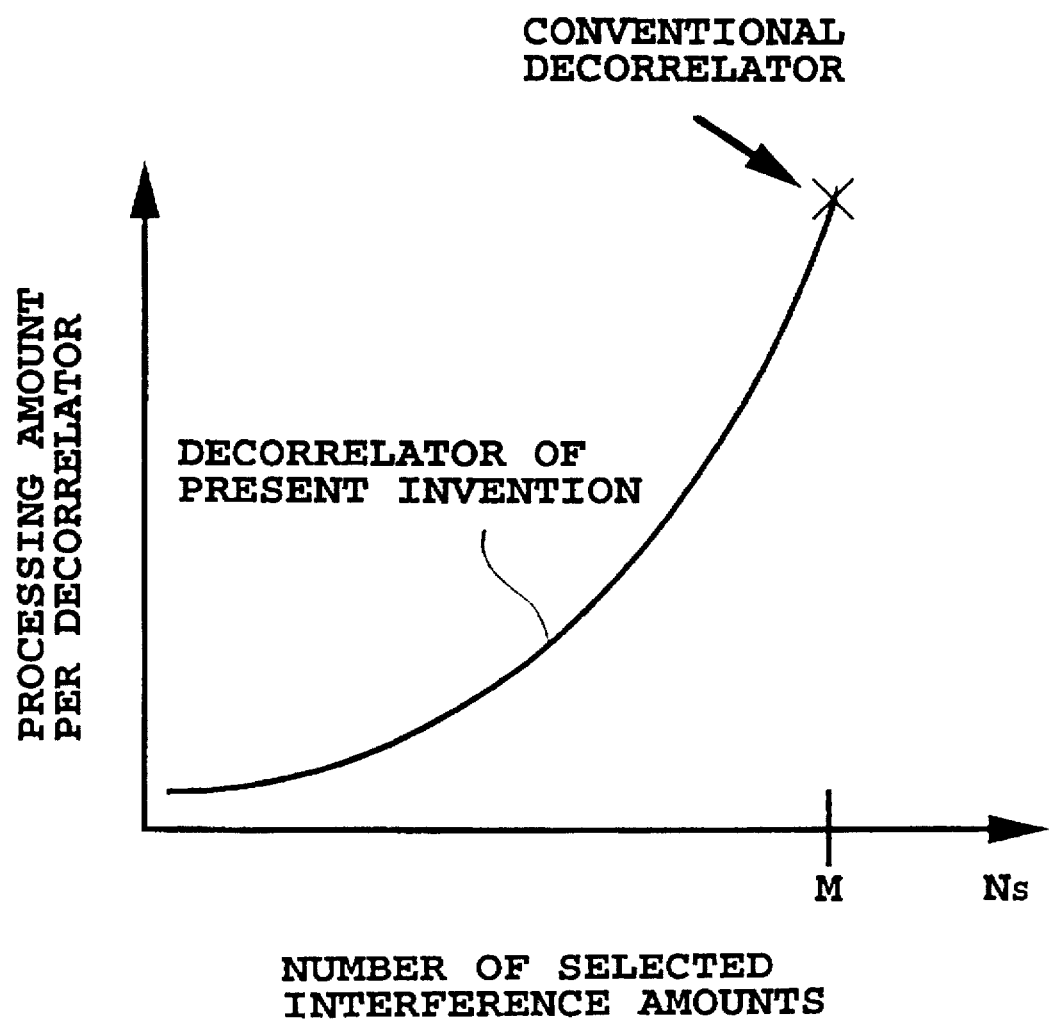
FIG. 12 is a graph illustrating a processing amount per decorrelator in accordance with the present invention in comparison with that of the conventional example.

FIG. 12 is a graph illustrating a processing amount per decorrelator, wherein the abscissas represent the number of signals fed to the decorrelator, and the ordinates represent the processing amount per decorrelator. The curve represents the processing amounts per decorrelator in accordance with the present invention, and the X mark indicates the processing amount per conventional decorrelator. Since the decorrelating operation consists of a calculation of an inverse matrix, its processing amount is proportional to the third power of the dimension of the correlation matrix. Consequently, the conventional decorrelator which performs orthogonalization of the entire received symbols in a batch mode becomes very difficult to be implemented as the number of users and paths increase. Furthermore, since it is difficult for the inverse matrix calculation to be handled by the parallel processing, hardware with parallel processing is difficult to realize. In contrast with this, since the present invention employs multiple small order decorrelators, the processing amount can be greatly reduce.

Embodiment 2

In the first embodiment shown in FIGS. 3A and 3B, the received signal levels are detected at the outputs of the despreading filters 11. This presents a problem in that the levels of a desired signal cannot be detected correctly when the interference level is high because of many simultaneous users.

Figure 13:
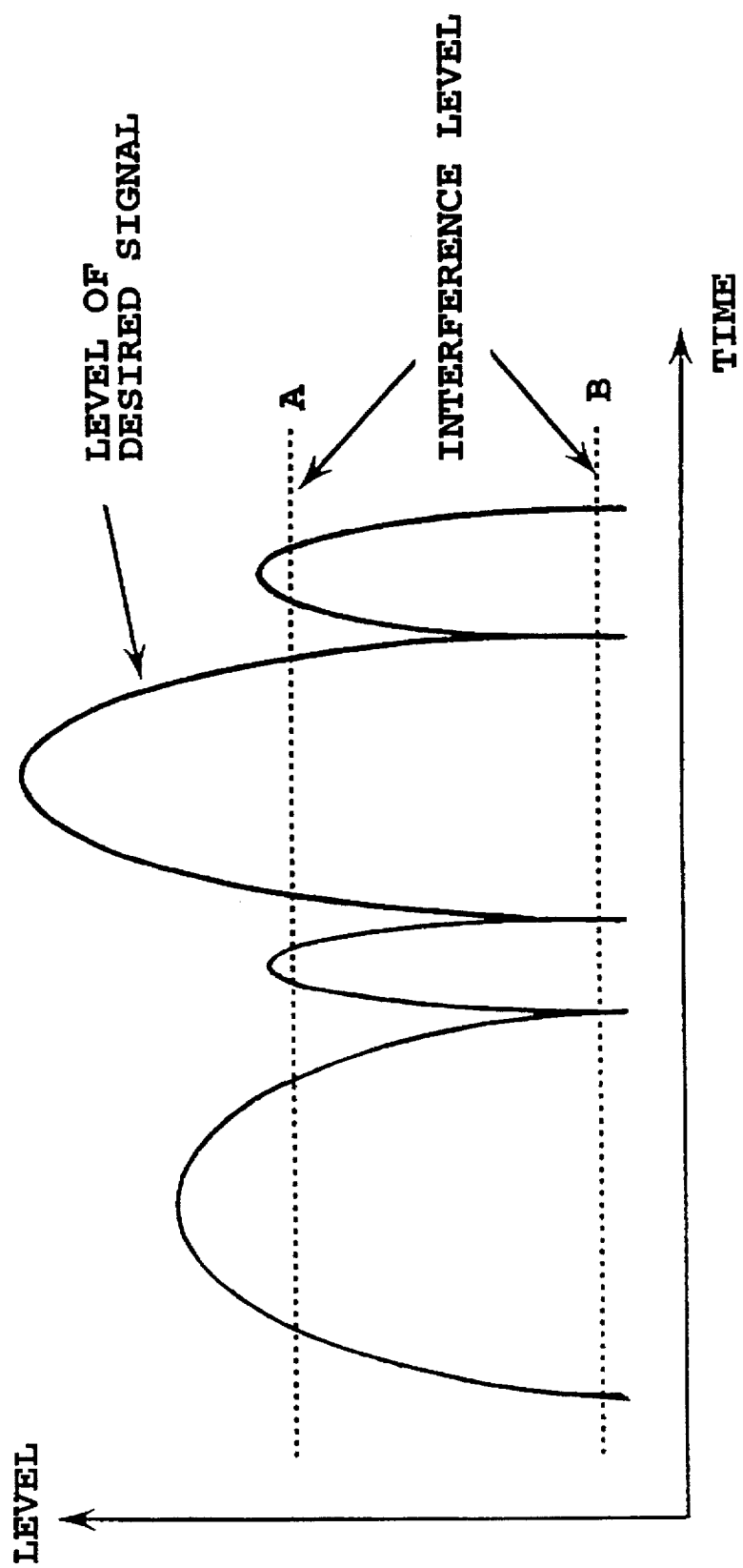
FIG. 13 is a graph for explaining improvement in a second embodiment.

FIG. 13 is a graph illustrating this problem, in which the fluctuations of the received signal level is shown under a fading environment. In this graph, solid lines represent level fluctuations of a desired signal, and dotted lines A and B indicate interference levels. Although the interference levels from the other users also fluctuate, they are averaged as A and B because they are independent fading. When the received signal level is sufficiently higher than the interference level as A, the amplitude fluctuations of the received signal substantially agree with the despread output level. The desired signal, however, may be buried in the interference if the received signal level is low in comparison with the interference level as B, in which case the amplitude fluctuations of the received signal cannot be correctly estimated at the despread output.

Figures 14, 14A:
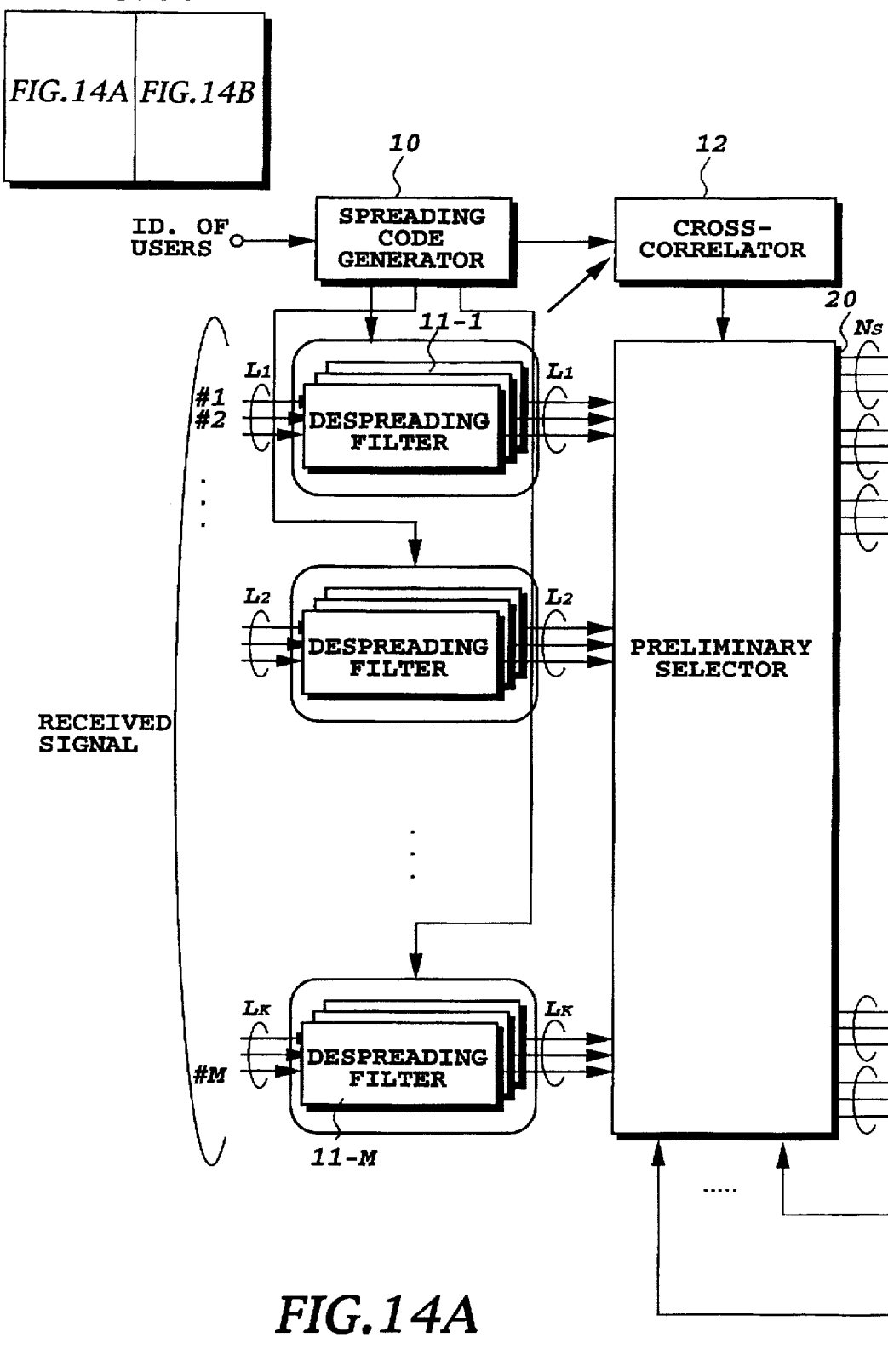
FIGS. 14A and 14B are block diagrams showing the second embodiment of a CDMA multiuser receiver in accordance with the present invention.
Figure 14B:
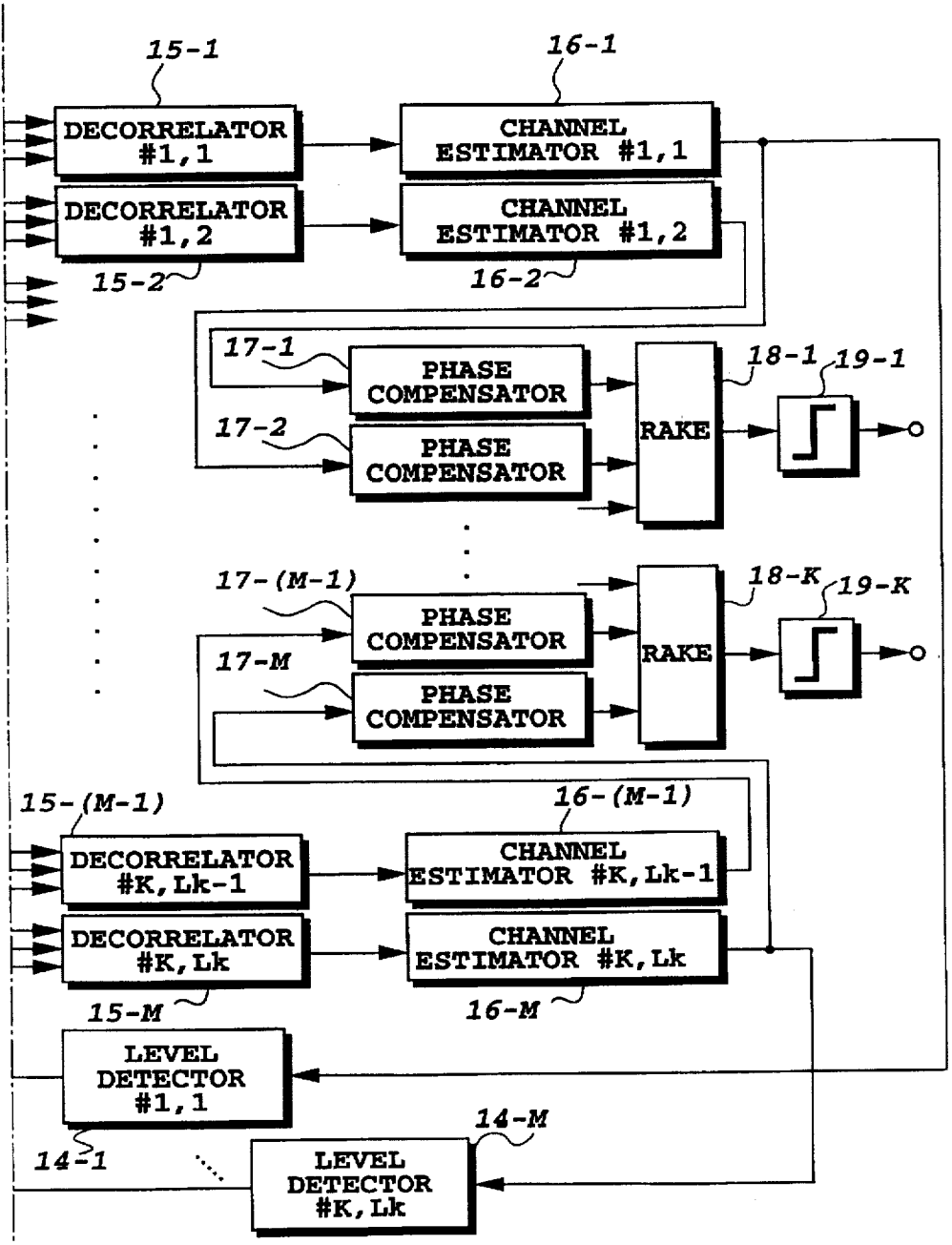

The second embodiment is proposed to solve such a problem. It will now be described with reference to FIGS. 14A and 14B. The second embodiment differs from the first embodiment in the positions of the level detectors 14. Specifically, the input terminals of the level detectors 14 are connected to the output terminals of the channel estimators 16 in this embodiment. The level detectors 14 may be connected to the output terminals of the decorrelators 15.

According to this embodiment, the level detectors 14 carry out level detection based on the output signals from the decorrelators. These output signals differ from the output signals from the despreading filters in that they include no interference components due to cross-correlations between the spreading codes. As a result, highly accurate level detection is possible even if the interference level is as high as B in FIG. 13.

Furthermore, since the signal passing through the channel estimators 16 undergo the estimation of amplitude and phase fluctuations, the received signal levels can be estimated more accurately.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A CDMA multiuser receiver in a CDMA system in which a transmitter side assigns different spreading codes to respective users, and transmits symbols of the users after spectrum spreading the symbols using the spreading codes associated with the users, and a receiver side receives signals transmitted from the users through one or more paths, and separates at least one of received signals, said CDMA multiuser receiver comprising:

despreaders for despreading said received signals by using spreading codes associated with the users, and for outputting receive timing information of said received signals on each of said paths;

level detectors for detecting received signal levels of said received signals on said paths;

cross-correlation calculation means for calculating for each of said paths cross-correlations between said spreading codes taking account of said receive timing information;

selecting means for obtaining, for each of said paths, interference amounts from the other paths on the basis of said received signal levels and said cross-correlations between said spreading codes, and for selecting Ns paths in order of magnitude of said interference amounts (Ns is an integer greater than one); and decorrelators for obtaining despread outputs, from which interferences are canceled, on the basis of received symbols and cross-correlations associated with said Ns paths selected.

2. The CDMA multiuser receiver as claimed in claim 1, wherein said spreading codes consist of short codes and long codes, said short codes having a period equal to one symbol duration, and said long code having a period greater than 10,000 symbol intervals.

3. The CDMA multiuser receiver as claimed in claim 1, wherein said spreading codes consist of middle codes, said middle codes having a period longer than one symbol period and shorter than 10,000 symbol intervals.

4. The CDMA multiuser receiver as claimed in claim 1, wherein said spreading codes consist of short codes whose period equals one symbol duration.

5. The CDMA multiuser receiver as claimed in claim 1, wherein said spreading codes consist of short codes whose period equals one symbol duration, and wherein different spreading code groups are used in different cells.

6. The CDMA multiuser receiver as claimed in claim 1, wherein said interference amounts from other paths are products of said received signal levels of other paths and cross-correlations between said spreading codes.

7. The CDMA multiuser receiver as claimed in claim 1, wherein said decorrelators are each provided for each of said paths.

8. The CDMA multiuser receiver as claimed in claim 1, wherein said level detectors detect levels of output signals of said despreaders.

9. The CDMA multiuser receiver as claimed in claim 1, wherein said level detectors detect levels of output signals of said decorrelators.

10. The CDMA multiuser receiver as claimed in claim 9, further comprising channel estimation means connected to output terminals of said decorrelators for estimating phase fluctuations due to fading on the basis of pilot symbols of a known pattern, and wherein said level detectors detect levels of output signals of said channel estimation means.

11. The CDMA multiuser receiver as claimed in claim 10, wherein said pilot symbols are periodically inserted into information symbols.

12. The CDMA multiuser receiver as claimed in claim 10, wherein said pilot symbols are continuously transmitted through a dedicated channel.

13. A CDMA multiuser receiving method in a CDMA system in which a transmitter side assigns different spreading codes to respective users, and transmits symbols of the users after spectrum spreading the symbols using the spreading codes associated with the users, and a receiver side receives signals transmitted from the users through one or more paths, and separates at least one of received signals, said CDMA multiuser receiving method comprising the steps of:

despreading said received signals by using spreading codes associated with the users, and for outputting receive timing information of said received signals on each of said paths;

detecting received signal levels of said received signals on said paths;

calculating for each of said paths cross-correlations between said spreading codes taking account of said receive timing information;

obtaining, for each of said paths, interference amounts from the other paths on the basis of said received signal levels and said cross-correlations between said spreading codes;

selecting Ns paths in order of magnitude of said interference amounts (Ns is an integer greater than one); and obtaining despread outputs, from which interferences are canceled, on the basis of received symbols and cross-correlations associated with said Ns paths selected.

\* \* \* \* \*

UNITED STATES PATENT AND TRADEMARK OFFICE
CERTIFICATE OF CORRECTION

PATENT NO.         : 5,724,378
APPLICATION NO. : 08/569002
DATED              : March 3, 1998
INVENTOR(S)       : Yoshinori Miki and Mamoru Sawahashi Page 1 of 1

It is certified that error appears in the above-identified patent and that said Letters Patent is hereby corrected as shown below:

Title Page: After "Assignee" change "NIT" to --NTT--
Col. 9, Ln. 35: Change "31-th" to --31-st--
Col. 9, Ln. 64: Change "reduce" to --reduced--

Signed and Sealed this

Thirty-first Day of July, 2007

JON W. DUDAS
*Director of the United States Patent and Trademark Office*